Aug. 9, 1932. A. G. M. MICHELL Re. 18,558

AIR COOLING MEANS FOR INTERNAL COMBUSTION ENGINES

Filed Sept. 20, 1927

2 Sheets-Sheet 1

Inventor,
Anthony G. M. Michell,
By Henry Orth Jr Atty.

A. G. M. MICHELL

Aug. 9, 1932. Re. 18,558

AIR COOLING MEANS FOR INTERNAL COMBUSTION ENGINES

Filed Sept. 20, 1927

2 Sheets-Sheet 2

Inventor

Anthony G. M. Michell,

By

Attorney

Reissued Aug. 9, 1932 Re. 18,558

UNITED STATES PATENT OFFICE

ANTHONY GEORGE MALDON MICHELL, OF MELBOURNE, VICTORIA, AUSTRALIA, ASSIGNOR, BY MESNE ASSIGNMENTS, TO MICHELL-CRANKLESS ENGINES CORPORATION, OF NEW YORK, N. Y., A CORPORATION OF NEW YORK

AIR COOLING MEANS FOR INTERNAL COMBUSTION ENGINES

Original No. 1,670,666, dated May 22, 1928, Serial No. 220,762, filed September 20, 1927, and in Great Britain July 27, 1926. Application for reissue filed April 28, 1931. Serial No. 533,530.

The object of the present invention is the provision of more effective and efficient air-cooling means for the cylinders of internal combustion engines of the type in which the axes of the working cylinders are parallel to the axis of the shaft. For brevity, such engines are hereinafter referred to as crankless engines. The invention is especially directed towards cooling the engine by means of the air currents produced around it as the result of its own passage through the air when mounted in a flying-machine or other vehicle, but the invention is also in part applicable to stationary engines.

It is in many cases desirable to arrange the working cylinders of crankless engines at the rear as well as the front of the main case of the engine, or sometimes at the rear only. It is to the cooling of such rear cylinders that the present invention, which consists in improved cooling apparatus, is particularly directed.

According to the present invention, the air meeting the front (or windward end) of the engine and being thereby deflected outwardly is intercepted by an annular series of baffles or a deflector of such shape and arrangement that parallel air streams are formed, such parallel streams being subsequently intercepted by an annular series of baffles at the leeward end of the engine and of such shape and arrangement that the parallel air streams are diverted inwardly upon and over the rear cylinders. The baffles may be arranged in stepped annular formation. The deflector may be of annular or cylindrical shape, its rear being apertured centrally. A fan may be provided at or near the exit from said deflector.

Figure 6:
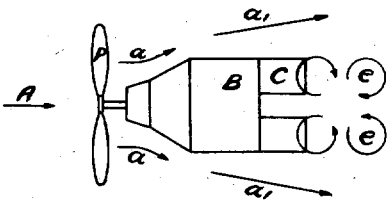
Figure 7:
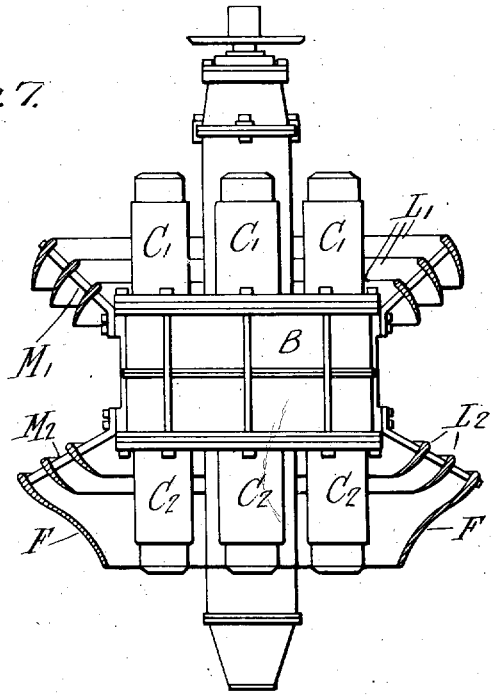
Figure 8:
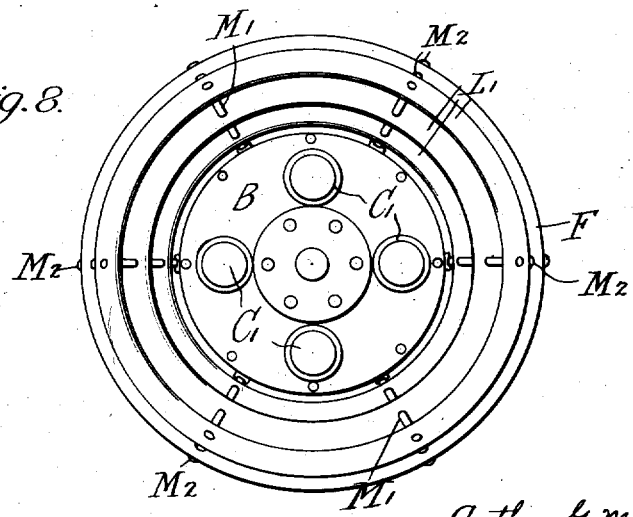

In the accompanying drawings, the invention is shown in Figs. 1 to 3, 5, 7 and 8, as applied to engines of flying machines; Figs. 1 to 3 and 5 being diagrammatic, while Figs. 7 and 8 are longitudinal and end views respectively of a practical form of construction of an engine and the cooling device as shown diagrammatically, in Fig. 2. Fig. 4 is a diagrammatic view showing the application of the invention to a stationary engine. Fig. 6 is a diagrammatic view of a crankless engine for flying machines without the cooling device.

In each of the Figs. 1, 2, 3, 5 and 6, the engine shown by way of illlustration, is a crankless engine adapted to be propelled together with its support, through the air by means of a propeller P mounted at the front of the engine.

Figs. 1, 3, 5 and 6 represent single-ended engines, that is to say engines having their working cylinders C mounted only on the rear ends of their castings or bodies B.

For convenience of explanation of the improved cooling apparatus the engine will be regarded as at rest, as is the case of the crankless engine in Fig. 4, and the air as moving in the direction shown by the arrows *a* and *x* so that the air has thus the same motion relative to the engine as if the latter were travelling forward in still air.

In an engine unprovided with the cooling apparatus which forms the subject of the present invention, air streams meeting the front or windward end of the body B tend to be deflected laterally away from the engine, as indicated in Fig. 6, and to diverge more and more as they progress towards the rear, as shown at $a_1$ $a_1$ in that figure. The air surrounding the cylinders C is in consequence either stagnant, or, at the most, disturbed only by secondary eddies *e e* as indicated in Fig. 6, and has consequently little cooling effect.

Figure 3:
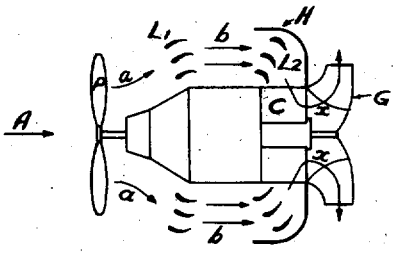
Figure 4:
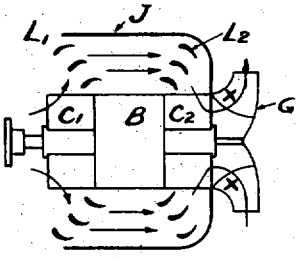
Figure 5:
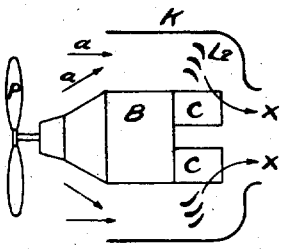

According to the present invention, and as shown in Figs. 1, 2, 3, 4 and 7, air is intercepted by an angular series of baffles $L_1$ arranged around the front circumference of the body B. Alternatively, a cylindrical deflector K may be provided for the same purpose as shown in Fig. 5.

The baffles $L_1$ and $L_2$ are of stream-line forms and are designed to deflect the air with as little loss of energy as possible into paths *b b* approximately parallel to the axis of the engine. At the rear or leeward end of the engine, a second annular series of baffles $L_2$ is arranged, these being located so as to deflect the airstreams *b b* inwardly over and between the cylinders and designed, like the baffles $L_1$, to deflect the air with the least possible loss of energy.

Figure 1:
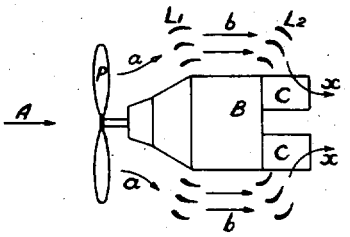
Figure 2:
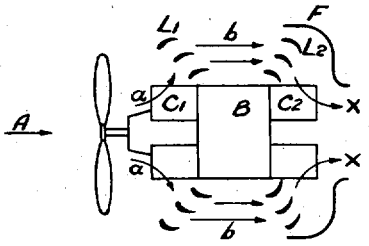

In the double-ended engine shown in Fig. 2, in which cylinders $C_1$ are mounted at the front end as well as the cylinders $C_2$ at the rear end of the engine body B, the air streams *a a* are deflected outwards partly by the front cylinders, which they serve to cool, and partly by the front of the body B, as in the arrangement illustrated in Fig. 1. The series of front baffles $L_1$ is therefore distributed over a greater axial distance than in Fig. 1 so as to intercept as far as possible the various streams diverging from both the body B and the cylinders $C_1$. In other respects the construction and effects in the arrangement of Fig. 2 are similar to those of Fig. 1. In both the single and double-ended constructions, annular deflectors F may be added, continued by cylindrical extensions outside the leeward louvres, as indicated in Figs. 2 and 7, to intercept additional air and/or to concentrate the flow of air about the cylinder heads.

The construction shown in Fig. 3 is precisely the same as that of Fig. 1, except that a fan G is mounted at the rear end of the engine, upon, or co-axially with, and driven by the engine shaft so as to receive the air-stream issuing from between the cylinders, and by its propelling or tractive action upon the air, increase the flow and cooling effect of the current. In order to prevent air from being drawn directly into the inlet of the fan G without passing over and cooling the cylinders C an annular deflector H may be fitted, this deflector being also continued outside the leeward louvres, as shown.

A practical mode of construction of the baffles above described and their attachment to the engine, is illustrated in Figs. 7 and 8. According to these figures the baffles $L_1$ and $L_2$ are continuous rings, of stream like section, preferably of light alloy, smoothly machined, arranged concentrically and attached to one another and to the engine by oblique radial bracket-arms $M_1$ $M_2$.

The deflector F, is preferably spun from sheet metal and being concentric with the baffles $L_2$ may also be attached with them to the engine by the arms $M_2$.

In the double-ended engine represented in Fig. 4, and operating as a stationary engine, the fan G alone produces the propelling effect upon the cooling-air. In order to prevent the fan from drawing air directly into its inlet without such air passing between the baffles $L_1$ and $L_2$ and over the cylinders, the baffles are surrounded by a cylindrical deflector J. The construction and effect of the cooling means in this case are similar to those shown in Fig. 2 except for the addition of the fan G, and the increased length of the cylindrical portion of the deflector J in Fig. 4 as compared with the deflector F in Fig. 2. It is to be understood that these modifications are also applicable to a double-ended engine when fitted with a propeller, as shown in Fig. 2, and used as the engine of a flying machine.

The sets of baffles $L_1$ and $L_2$ are preferably so arranged that each set comprises baffles in stepped or echelon formation, the baffles of each set being somewhat in advance one of another.

I claim:

1. The combination with an internal combustion engine, of a series of annular baffles at the front of the engine for forming air streams parallel to the axes of the engine cylinders, and a series of annular baffles at the leeward end of the engine to intercept said parallel air streams and divert them inwardly upon and over the rear cylinders.

2. The combination with an internal combustion engine, in which the working cylinders are cooled by a current of air flowing parallel to the axis of the engine, of a series of annular baffles arranged in stepped formation for deflecting said current of air inwardly upon and between the engine cylinders situated at the leeward end of the engine.

3. The combination with an air-cooled internal combustion crankless engine, of a series of annular baffles arranged around the windward end of the engine, a series of annular baffles arranged around the leeward end of the engine, and a centrally apertured annular baffle surrounding the leeward baffles.

4. In combination, an internal combustion engine comprising a shaft and power means for operating said shaft including cylinders, and pistons operatively connected to the shaft, and air-cooling means for the engine including an annular baffle surrounding the cylinders, said baffle being of stream-line construction, co-axial with the shaft axis and inclined at an angle thereto for deflecting the air on the engine cylinders.

5. In combination, an internal combustion engine comprising a shaft and power means for operating said shaft including cylinders, and pistons operatively connected to the shaft, and air-cooling means for the engine including annular baffles, of stream-line construction, co-axial with the shaft axis, said baffles being arranged at an angle with respect to the axis to intercept air streams and to direct said streams in paths parallel to the engine shaft.

6. In combination, an internal combustion engine comprising a shaft and power means for operating said shaft including cylinders, and pistons operatively connected to the shaft, and air-cooling means for the engine including a series of annular baffles, of stream-line construction, co-axial with the shaft axis and inclined thereto for deflecting the air on the engine cylinders.

7. In combination, an internal combustion engine comprising a shaft and power means for operating said shaft including cylinders, and pistons operatively connected to the shaft, and air-cooling means for the engine including a series of annular baffles arranged in step formation, co-axial with the shaft axis for deflecting the air on the engine cylinders.

8. In combination, an internal combustion engine comprising a shaft and power means for operating said shaft including cylinders, and pistons operatively connected to the shaft, and air-cooling means for the engine including an annular baffle, of stream-line construction, encircling the cylinders for deflecting the air on the engine cylinders.

In witness whereof, I have hereunto set my hand this 18th day of April, 1931.

ANTHONY GEORGE MALDON MICHELL.